United States Patent [19]

Ito et al.

[11] Patent Number: 4,570,601

[45] Date of Patent: Feb. 18, 1986

[54] FUEL DELIVERY PIPE

[75] Inventors: Masaki Ito, Handa; Hiroshi Yamazoe, Anjo, both of Japan

[73] Assignee: Nippondenso Co., Ltd., Kariya, Japan

[21] Appl. No.: 669,514

[22] Filed: Nov. 8, 1984

[30] Foreign Application Priority Data

Nov. 15, 1983 [JP] Japan .................................. 58-214850

[51] Int. Cl.[4] ............................................ F02M 39/00
[52] U.S. Cl. ................................... 123/468; 239/585; 239/550
[58] Field of Search ............... 123/468, 469, 470, 472, 123/456; 239/550, 547, 585, 88–92; 137/870, 625.12, 883, DIG. 10

[56] References Cited

U.S. PATENT DOCUMENTS

| 3,412,718 | 11/1968 | Long | 123/468 |
|---|---|---|---|
| 3,776,209 | 12/1973 | Wertheimer | 239/550 |
| 3,788,287 | 1/1974 | Falen | 123/472 |
| 3,930,483 | 1/1976 | Blisko | 239/550 |
| 3,998,392 | 12/1976 | St. Clair | 239/547 |
| 4,205,637 | 6/1980 | Ito | 123/456 |
| 4,219,154 | 8/1980 | Luscomb | 239/585 |

FOREIGN PATENT DOCUMENTS

| 2833659 | 2/1980 | Fed. Rep. of Germany | 123/468 |
|---|---|---|---|
| 59-45275 | 3/1984 | Japan | 123/472 |

Primary Examiner—Carl Stuart Miller
Attorney, Agent, or Firm—Cushman, Darby & Cushman

[57] ABSTRACT

The fuel delivery pipe comprises a cylindrical main body provided with two closed ends and made of heat and electricity insulating plastic, a plurality of fuel outlet ports which are provided in a cylindrical wall of the main body and to which injectors of an internal combustion engine are connected for supplying fuel to the injectors, and a plurality of power supply connectors, each of which is provided near each of said fuel outlet ports and is electrically connected to an input connector provided in the cylindrical main body by means of lead wires embedded within the cylindrical main body in the molding process. A cable is connected to the input connector for supplying a fuel injection signal from a control computer thereto. When the injectors are connected to the fuel outlet ports, a power reception connector of each of the injectors is electrically connected to each of the power supply connectors.

6 Claims, 4 Drawing Figures

FUEL DELIVERY PIPE

BACKGROUND OF THE INVENTION

The present invention relates to a fuel delivery pipe for delivering fuel to fuel injectors installed in an intake manifold or the like of an engine, in an electronic fuel injection system (EFI).

The fuel delivery pipe comprises a cylindrical body of which both ends are closed and to which pressurized fuel is introduced from a fuel pump and a plurality of fuel outlet ports provided in a cylindrical wall of the cylindrical body, each of which is to be connected to each of the fuel injectors for delivering fuel thereto.

Generally, the fuel delivery pipe is further provided with a pressure regulator for regulating the pressure of the fuel to be delivered to the fuel injectors.

By providing the fuel delivery pipe having the above described structure, only one fuel inlet pipe and only one fuel return pipe are required for connecting the fuel pump and the injectors. So, time and trouble for arranging a plurality of inlet pipes and return pipes, each of which is connected to each of the injectors can be largely reduced.

Each of the above described injectors injects fuel when an electromagnetic coil of each injector receives power. And conventionally for applying power to the electromagnetic coil of each injector, a fuel injection control computer is connected to each of the injectors by means of a plurality of cables so that time and trouble have been required for wiring and maintaining such cables.

In addition, the conventional delivery pipe is generally made of a metal such as aluminum, so heat of an engine is liable to be transmitted to the conventional delivery pipe. Such a conventional delivery pipe has a problem that the injection efficiency of the injectors lowers as the heat of the engine is transferred to the delivery pipe to evaporate the fuel delivered thereto.

SUMMARY OF THE INVENTION

An object of the present invention is to provide a fuel delivery pipe by which time and trouble required for wiring and maintaining cables to be used to supply signals to injectors can be largely reduced.

Another object of the present invention is to provide a fuel delivery pipe which obstructs the heat transfer from an engine to prevent the evaporation of the fuel therewithin.

A fuel delivery pipe of the present invention comprises a cylindrical main body provided with two closed ends and made of heat and electricity insulating plastic or reinforced plastic, a fuel regulator provided in the cylindrical main body for regulating the fuel pressure within the cylindrical main body, a plurality of fuel outlet ports provided in a cylindrical wall of the cylindrical main body at predetermined intervals, an input connector provided in the cylindrical main body and connected to a fuel injection control computer by means of a cable, power supply connectors provided in the cylindrical wall of the cylindrical main body near the outlet ports, and lead wires embedded within the main body for electrically connecting the input connector and the power supply connectors. A fuel inlet pipe and a fuel return pipe is connected to the cylindrical main body.

When the injectors are connected to the fuel outlet ports of the fuel delivery pipe, power reception connectors of the injectors are electrically connected to the power supply connectors. When a fuel injection signal is supplied from the fuel injection control computer to the input connector by means of the cable, the signal is supplied to the injectors through the lead wires, the power supply connectors and the power reception connectors.

DETAILED DESCRIPTION OF THE EMBODIMENTS

Hereinafter, the present invention will be explained in accordance with one embodiment thereof with reference to the accompanying drawings.

Figure 1:
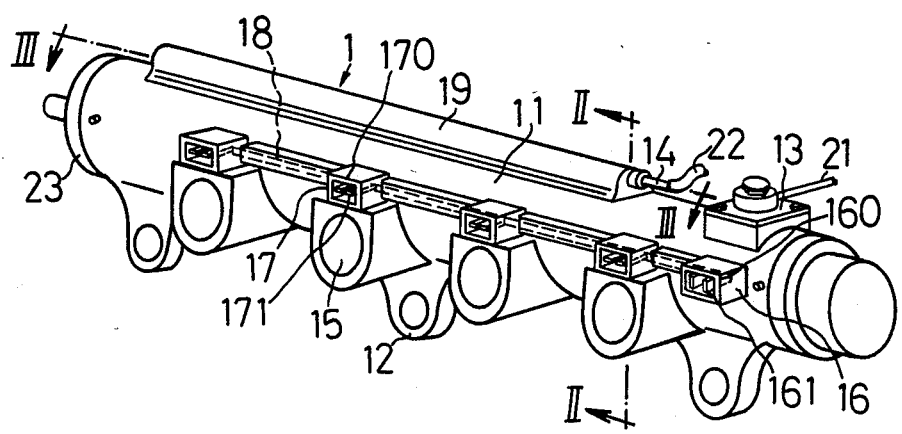
FIG. 1 is a perspective view of the whole fuel delivery pipe.

In FIG. 1, a fuel delivery pipe 1 is integrally formed of heat and electricity insulating plastic or reinforced plastic and comprises a cylindrical main body 11 of which both ends are closed.

An inlet pipe connecting portion 13 is provided on one end portion of the main body 11. A fuel inlet pipe 21 is connected to the inlet pipe connecting portion 13. A pressurized fuel is introduced into the interior of the main body 11 from a fuel pump (not shown) by way of the fuel inlet pipe 21.

Figure 2:
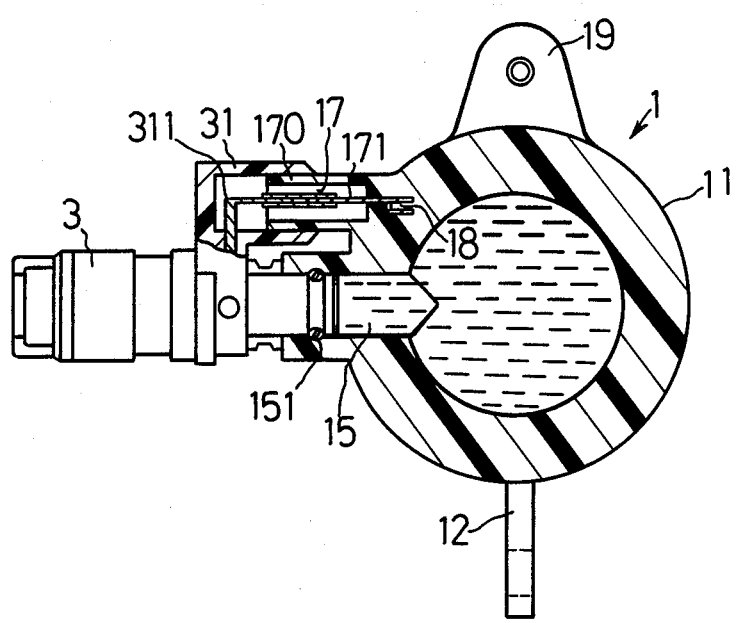
FIG. 2 is a sectional view taken along line II—II of FIG. 1, which illustrates the condition where an injector is connected to an outlet port of the fuel delivery pipe.

A plurality of outlet ports 15 are provided on a side wall of the main body 11 so as to be opposed to an intake manifold (not shown) and an engine (not shown). Each outlet port 15 is a pipe joint provided with an O ring 151 as shown in FIG. 2. The fuel introduced into the interior of the main body 11 is directly supplied to each injector 3 by connecting a base end thereof to each outlet port 15.

Figure 3:
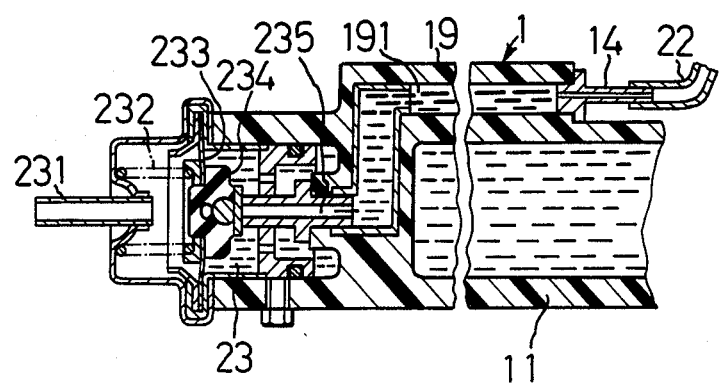
FIG. 3 is a sectional view taken along the ling III—III of FIG. 1, which illustrates a pressure regulator and a fuel return passage provided in the fuel delivery pipe.

A well known pressure regulator 23 for regulating the pressure of the fuel introduced into the main body 11 into a predetermined level, is provided at one end of the main body 11 as shown in FIG. 3. The pressure regulator 23 comprises a pipe 231 communicated with an intake pipe (not shown) of the engine, a coil spring 232, a diaphragm 233, a valve body 234 moving with the diaphragm 233 and a fuel return passage 235 opened or closed by the valve body 234.

As the pressure of the fuel introduced into the main body 11 increases, the diaphragm 233 moves to the left in FIG. 3 and excess fuel is discharged from the interior of the main body 11 to the return passage 235.

A projecting portion 19 is provided on the upper surface of the main body 11 as shown in FIGS. 1 and 3 and a return passage 191 communicated with the return passage 235 is defined thereby. The excess fuel flows in the return passage 191 and returned to a fuel tank (not shown) by way of a fuel return hose 22 which is connected to the projecting portion 19 by means of a metal fitting 14.

An input connector 16 is provided on the side wall of the main body 11 and a cable (not shown) is connected to the input connector 16 for supplying a fuel injection signal from a fuel injection control computer (not shown) thereto.

A power supply connector 17 is provided on the side wall of the main body 11 adjacent to and above each of the outlet ports 15. The input connector 16 is connected to the power supply connectors 17 by means of a pair of lead wires 18 integrally embedded within the side wall of the main body 11.

Each of the connectors 16 and 17 comprises a housing 160 or 170 integrally formed with the main body 11. Within each of the housings 160 and 170, a pair of connector pins 161 or 171 are disposed. One of the pair of lead wires 18 connects one of the connector pins 161 of the connector 16 to one of the connector pins 171 of each of the connectors 17 while the other lead wire 18 connects the other connector pin 161 of the connector 16 to the other connector pin 171 of each of the connectors 17.

The plastic for forming the fuel delivery pipe 1 is made of a synthetic resin such as nylon and polyphenylene sulphide, and the reinforced plastic is made of a mixture of the above synthetic resin and an inorganic filler such as glass fiber and plate-shaped silica. The above described synthetic resin is excellent in electricity insulating porperty as well as heat insulating porperty. Therefore, the connector pins 161 and 171 and the lead wires 18 can be formed by directly embedding metallic lead members into the above described synthetic resin in the fuel delivery pipe molding step.

Figure 4:
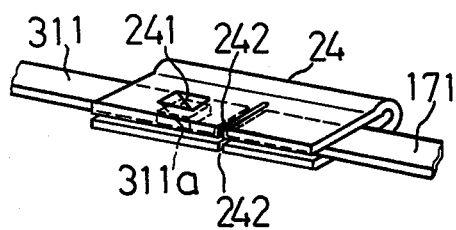
FIG. 4 is a perspective view illustrating the connection of connector pins.

A power reception connector 31 of each of the injectors 3 is provided with a connection fitting 24 for connecting connector pins 311 to the connector pins 171. The connection fitting 24 is formed by folding a resilient metal plate into a double layered rectangular shape as shown in FIG. 4. And a cutting 242 is provided in each of the upper and under plates of the connection fitting 24 in the width direction thereof.

One portion of the upper plate of the connection fitting 24 is cut and bent downwardly to form a claw 241. A through hole 311a is formed in a top end of the connector pin 311. The connector pin 311 is inserted between the upper plate and the under plate of the connection fitting 24 and at this time the claw 241 is closely inserted into the through hole 311a of the connector pin 311. Thus, the connection fitting 24 is fixed to the connector pin 311.

When the injectors 3 are connected to the outlet ports 15 of the fuel delivery pipe 1, the connectors 31 of the injectors 3 are connected to the connectors 17 of the delivery pipe 1 as shown in FIG. 2. Namely, the top end of each connector pin 171 is inserted into the connection fitting 24 as shown in FIG. 4 so that the connector pin 171 is electrically connected to the connector pin 311. Thus, the injectors 3 are mechanically and electrically connected to the fuel delivery pipe 1 at the same time.

Then, the fuel delivery pipe 1 is attached to an engine in bracket portion 12 projecting downwards from the main body 11 thereof so that each injectors 3 is positioned within the corresponding intake manifold.

As described above, according to the present invention, the lead wires 18 electrically connecting the input connector 16 to the injectors 3 are embedded within the cylindrical main body of the fuel delivery pipe 1. Therefore, the fuel injection signal can be supplied from the fuel injection control computer to the injectors by connecting the computer to the input connector 16 by means of only one cable.

Consequently, according to the fuel delivery pipe of the present invention, time and trouble for wiring and maintaining cables can be largely reduced as compared with the conventional pipe which requires a plurality of cables for supplying a fuel injection signal from the computer to the injectors 3.

The fuel delivery pipe of the present invention is formed of heat insulating plastic or reinforced plastic. Therefore, even when such a fuel delivery pipe is installed near an engine, it can effectively prevent heat of the engine from being transferred to the interior thereof, so that the evaporation of the fuel delivered to the fuel delivery pipe can be prevented.

In addition, since the plastic or reinforced plastic used in the embodiment of the present invention has electricity insulating property, the connector pins of the input connector 16 and the power supply connectors 17, and the lead wires 18 can be embedded within the fuel delivery pipe without being covered with any covering layer in the fuel delivery pipe molding step. Therefore, the above described connector pins and lead wires can be easily installed in the fuel delivery pipe.

Furthermore, since the fuel return passage 191 is integrally formed with the main body 11 of the fuel delivery pipe 1, the length of the return hose 22 connecting the return passage 191 to the fuel tannk can be decreased.

As described above, the fuel delivery pipe of the present invention can be easily produced. And it can largely reduce time and trouble for wiring cables from the fuel injection control computer to the injectors and can effectively prevent the heat transfer form an engine, so as to prevent the evaporation of the fuel delivered thereto.

What is claimed is:

1. A fuel delivery pipe for delivering fuel into injectors of an internal combustion engine comprising:
    a cylindrical main body provided with two closed ends and made of heat and electricity insulating plastic material, a fuel inlet pipe and a fuel return pipe being connected to said cylindrical main body;
    a fuel regulator provided in said cylindrical main body for regulating the fuel pressure within said cylindrical main body;
    a plurality of fuel outlet ports provided in a cylindrical wall of said cylindrical main body at predetermined intervals; said plurality of fuel outlet ports being to be connected to said injectors;
    an input connector provided in said cylindrical main body and connected to a fuel injection control computer by means of a cable;
    power supply connectors provided in said cylindrical main body and near said plurality of fuel outlet ports to be electrically connected to power reception connectors provided in said injectors; and
    lead wires embedded within said main body for electrically connecting said input connector and said power supply connectors.

2. A fuel delivery pipe according to claim 1, wherein said plastic material is one of nylon and polyphenylene sulphide.

3. A fuel delivery pipe according to claim 1, wherein said plastic material is reinforced plastic made of a mixture of one of nylon and polyphenylene sulphide, and an inorganic filler.

4. A fuel delivery pipe according to claim 1, wherein each of said input connector and said electric current supply connector is provided with a housing which is formed so as to be integral with said cylindrical main body.

5. A fuel delivery pipe according to claim 1, wherein each of said input connector and said power supply connector is provided with one pair of connector pins, said lead wires are composed of one pair of lead wires, and one of said one pair of lead wires connects one of said one pair of connector pins of said connectors to one another while the other of said one pair of lead wires connects the other of said one pair of connector pins of said connectors to one another.

6. A fuel delivery pipe according to claim 1, wherein said fuel inlet pipe is connected to one end of said cylindrical main body, said pressure regulator is provided within the other end of said cylindrical main body, said fuel delivery pipe further comprises a fuel return passage formed within a projecting portion extending from said the other end to said one end of said cylindrical main body along the outer wall thereof for flowing excess fuel released by means of said pressure regulator, and said fuel return passage opens at said one end of said cylindrical main body and is connected to said fuel return pipe.

* * * * *